United States Patent
Mazenc

(10) Patent No.: US 10,634,077 B2
(45) Date of Patent: Apr. 28, 2020

(54) METHOD FOR DETERMINING THE STATE OF ROTATION OF A CAMSHAFT OF A VEHICLE ENGINE

(71) Applicants: CONTINENTAL AUTOMOTIVE FRANCE, Toulouse (FR); CONTINENTAL AUTOMOTIVE GmbH, Hannover (DE)

(72) Inventor: Christophe Mazenc, Toulouse (FR)

(73) Assignees: CONTINENTAL AUTOMOTIVE FRANCE, Toulouse (FR); CONTINENTAL AUTOMOTIVE GMBH, Hannover (DE)

(*) Notice: Subject to any disclaimer, the term of this patent is extended or adjusted under 35 U.S.C. 154(b) by 131 days.

(21) Appl. No.: 15/745,659

(22) PCT Filed: Jul. 14, 2016

(86) PCT No.: PCT/EP2016/001224
§ 371 (c)(1),
(2) Date: Jan. 17, 2018

(87) PCT Pub. No.: WO2017/012706
PCT Pub. Date: Jan. 26, 2017

(65) Prior Publication Data
US 2018/0209362 A1    Jul. 26, 2018

(30) Foreign Application Priority Data

Jul. 21, 2015   (FR) .................................... 15 56872

(51) Int. Cl.
*G01M 15/06* (2006.01)
*F02D 41/00* (2006.01)
(Continued)

(52) U.S. Cl.
CPC ..... *F02D 41/0097* (2013.01); *F02D 13/0219* (2013.01); *F02D 41/042* (2013.01);
(Continued)

(58) Field of Classification Search
USPC .............................. 73/114.26, 114.27, 114.28
See application file for complete search history.

(56) References Cited

U.S. PATENT DOCUMENTS

2009/0265085 A1   10/2009   Hori
2009/0276145 A1   11/2009   Schafer et al.
(Continued)

FOREIGN PATENT DOCUMENTS

WO    03/018980 A1    3/2003

OTHER PUBLICATIONS

International Search Report dated Sep. 9, 2016, in corresponding PCT application, PCT/EP2016/001224.

*Primary Examiner* — Eric S. McCall
(74) *Attorney, Agent, or Firm* — Young & Thompson

(57) ABSTRACT

Disclosed is a method for determining the state of rotation of a camshaft of a vehicle engine, notable in that the method for determining the state of rotation of the camshaft determines that the state of rotation of the camshaft is "in the process of stalling", corresponding to an intermediate state of rotation, when the time elapsed since the last detection of a camshaft wheel tooth-front by the sensor exceeds Tcam_cal, Tcam_cal being defined as the theoretical length of time needed for the camshaft wheel to cover an angular distance equal to the maximum angular distance separating two successive camshaft wheel tooth-fronts at a camshaft rotational speed corresponding to a predetermined low engine speed higher than the minimum engine speed tolerated by the engine.

16 Claims, 2 Drawing Sheets

(51) Int. Cl.
*F02D 41/04* (2006.01)
*F02D 41/06* (2006.01)
*F02D 13/02* (2006.01)
*F01L 1/34* (2006.01)

(52) U.S. Cl.
CPC .............. *F02D 41/062* (2013.01); *F01L 1/34* (2013.01); *F01L 2800/01* (2013.01); *F01L 2800/03* (2013.01); *F01L 2820/041* (2013.01); *F01L 2820/042* (2013.01); *F02D 41/009* (2013.01)

(56) References Cited

U.S. PATENT DOCUMENTS

2014/0299080 A1* 10/2014 Zouboff ................ F02D 41/009
 123/90.15
2018/0313288 A1* 11/2018 Mazenc ................ F02D 41/22
2018/0347483 A1* 12/2018 Mazenc ................ F02D 41/009
2018/0356256 A1* 12/2018 Mirassou ............... G01D 5/145

* cited by examiner

METHOD FOR DETERMINING THE STATE OF ROTATION OF A CAMSHAFT OF A VEHICLE ENGINE

The invention relates to the determining of the state of rotation of a camshaft, in a vehicle engine. More specifically, the method for determining the state of rotation of a camshaft, according to the invention, is aimed at an improved, more rapid and more precise determination of the state of rotation of the camshaft and, therefore, at a more precise knowledge of the state of operation of the engine.

BACKGROUND OF THE INVENTION

It is well known to those skilled in the art that a vehicle powertrain is based notably on a crankshaft, to which there is coupled a crankshaft wheel, and a camshaft, to which there is coupled to a camshaft wheel. The crankshaft converts the rectilinear movement of the pistons into a rotational movement that drives the driveshaft. The camshaft, as its name suggests, is fitted with cams and its purpose is to convert the rotational movement of the driveshaft, imparted by the crankshaft, into a reciprocating movement either of translation, for example in the case of valves, or of rotation, for example in the case of rockers.

In this context, one of the functions of the engine management system of a combustion engine vehicle is to manage the injection of gasoline and the ignition of the engine. Present-day combustion engines comprise several cylinders and their principle of operation is well known to those skilled in the art. The engine management system needs to allow the correct quantity of gasoline to be injected at the correct moment into the correct cylinder in order to optimize the flexibility and power of the engine and minimize the resultant pollution. For this purpose it is necessary to know precisely the angular position of the driveshaft so as to ensure that the injection of gasoline is made into the cylinder that is in the intake phase. This whole process of determining which cylinder is in the intake phase, and into which the injection of gasoline is to be made, corresponds to what is referred to as the engine synchronization.

Thus, in order to ensure adequate engine management, it is absolutely essential to know the state of rotation of the engine. This state may adopt three status values:
i) either the engine is rotating, when it is turning over at a speed comprised within its operating range, namely higher than the minimum speed tolerated by the engine, below which engine management is no longer possible; in which case it is "rotating";
ii) or the engine is not turning over at all, in which case it is "stopped";
iii) or the state of rotation is indeterminate because it cannot be determined either that it is "rotating" or that it is "stopped"; it is therefore "in the process of stalling". It should be noted that the expression "in the process of stalling" means an engine which, because of its low inertia, behaves very unpredictably, with rotation forward or backward, a high degree of acyclism, the possibility of suddenly stopping, etc. This "in the process of stalling" rotation state is reached, in particular, when the engine speed reaches a stalling threshold from and below which the engine finds itself in a state in which its behavior therefore becomes unpredictable.

In order to know the state of rotation of the engine, it is known practice to consider the state of rotation of the crankshaft wheel, which is also that of the crankshaft, and the state of rotation of the camshaft wheel, which is also that of the camshaft.

Specifically, for reliability reasons, the determination that the engine has stopped rotating is based on verifying the two items of information that the crankshaft has stopped and that the camshaft has stopped.

As is known to those skilled in the art, the state of rotation of the crankshaft can be determined by observing the crankshaft wheel. The crankshaft wheel is a wheel the chief function of which is to make it possible to determine the angular position of the crankshaft. For this purpose, the crankshaft wheel comprises a plurality of teeth, numbered from a reference corresponding for example to the absence of at least one tooth on the periphery of the wheel. Typically, a crankshaft wheel of a vehicle engine comprises 60 teeth distributed about its periphery, and a gap of two missing teeth. The gap of two missing teeth serves as a reference for determining the angular position of the crankshaft wheel. Suitable detection means, positioned near the crankshaft wheel, detect the passage of the fronts of the crankshaft wheel teeth, it being understood that said detection means are configured to detect either only the rising fronts or only the falling fronts.

The state of rotation of the crankshaft is therefore determined according to the time elapsed since the last detection of a crankshaft wheel tooth-front.

The principle is therefore that if the detection means see crankshaft wheel tooth-fronts filing past, then the crankshaft is "rotating". When the detection means no longer see crankshaft wheel tooth-fronts filing past, then the crankshaft is "stopped". Between these two states, when the time since the last detection of a tooth-front lengthens, the crankshaft is "in the process of stalling", the engine being in the process of stalling.

In practice, engines have constraints relating to engine speed, so as to ensure that they operate normally. Outside of a range of normal values, engine management becomes inoperative. It is considered that the information derived from the detection means used for assessing the state of rotation of the crankshaft is no longer reliable. In particular for any engine, a minimum engine speed tolerated by the engine is generally defined, the minimum engine speed being defined as the engine speed below which the engine finds itself under operating conditions in which its behavior becomes completely unpredictable and in which it is no longer possible to provide effective engine management; this speed corresponds to the stalling threshold, according to the definition given hereinabove of the "in the process of stalling" state of rotation.

The criterion for verifying the state of rotation of the crankshaft therefore consists, according to the prior art, in evaluating the time elapsed since the last detection of a crankshaft wheel tooth-front. As long as this time is shorter than the theoretical time Tvil_cal taken by the crankshaft wheel to cover, at a speed corresponding to the minimum tolerated engine speed, an angular distance corresponding to the angular distance between two successive crankshaft wheel tooth-fronts capable of being detected by the detection means, the crankshaft is considered to be "rotating". As soon as the time elapsed since the last detection of a crankshaft wheel tooth-front becomes longer than Tvil_cal, the crankshaft is considered to be "in the process of stalling". When the same length of time becomes longer than a length of time Tvil_stop, that has been subject to calibration, the crankshaft is determined to be "stopped". Thus, Tvil_cal is a development value that makes it possible to suspect imminent stoppage of the engine, manifested in the "in the process of stalling" state of rotation, in this instance, of the crankshaft, and unpredictable engine behavior, whereas Tvil_stop is a development value which makes it possible to be certain that the crankshaft is completely stopped.

In general, when it is not possible to determine whether the crankshaft is "rotating" or "stopped", then said crankshaft is considered to be "in the process of stalling".

By way of illustration, if we consider a crankshaft wheel provided with 60 teeth evenly distributed about its periphery, then the angular separation between two successive tooth-fronts is 6°. At a minimum tolerated engine speed of 22 rpm, Tvil_cal is equal to 0.045 sec. So Tvil_stop is typically of the order of 0.3 sec.

The state machine depicted in FIG. 1 shows a state machine representing the various states of rotation of the crankshaft, as determined by the known method described hereinabove.

As is known, in order to ensure that the information relating to the state of rotation of the crankshaft is correct and that said state of rotation makes it possible to determine the state of operation of the engine, it is necessary to verify the rotation state "proposition" determined from monitoring the filing-past of the crankshaft wheel teeth by determining the state of rotation of the camshaft.

This is because the state of rotation of the crankshaft may be determined erroneously, for a number of reasons: broken crankshaft wheel tooth, malfunction of the crankshaft wheel tooth-front detection means, etc.

The camshaft is rotationally driven by a pinion which transmits the rotational movement of the crankshaft to it. Furthermore, the camshaft has cams, which allow the rotational movement of the drive shaft to be converted into a reciprocating movement, thus operating the valves. The camshaft also comprises a camshaft wheel the purpose of which is to allow the angular position of the camshaft to be determined.

However, it is possible, using means similar to those used for the crankshaft wheel, namely using a sensor that detects the passage of the camshaft wheel tooth-fronts, to attempt to determine whether the camshaft is "rotating" or "stopped". According to the prior art, the principle making it possible to determine the state of rotation of the camshaft consists, as it did in the case of the crankshaft, in evaluating the time elapsed since the last detection of a camshaft wheel tooth-front. As long as this time is shorter than the theoretical time Tcam taken by the camshaft wheel to cover, at a speed corresponding to the minimum tolerated engine speed, an angular distance corresponding to the maximum angular distance between two camshaft wheel tooth-fronts capable of being detected by the sensor provided for this purpose, the camshaft is considered to be "rotating". As soon as the time elapsed since the last detection of a camshaft wheel tooth-front becomes longer than Tcam, the camshaft is considered to be "stopped".

When it is not possible to determine whether the camshaft is "rotating" or "stopped", then said camshaft is considered to be "in the process of stalling". It should, however, be noted that, in the prior art, the state of rotation of the camshaft, according to the state machine depicted in FIG. 1, can pass from the "stopped" state to the "in the process of stalling" state after detecting a first camshaft wheel tooth-front and before detecting a second tooth-front and then pass to the "rotating" state after detecting the second camshaft wheel tooth-front. In the other direction, starting from the "rotating" state of rotation, the camshaft wheel can pass only into the "stopped" state when the time elapsed since the last detection of a camshaft wheel tooth-front exceeds Tcam.

If it is determined that the crankshaft and the camshaft are "rotating" or "stopped", there is no doubt that it can be deduced that the engine itself is, respectively, "rotating" or "stopped".

However, one shortcoming of this known technique is that the camshaft wheel has very few teeth, typically only four. As a result, two successive tooth-fronts are separated by a significant degree of angle that the camshaft wheel covers, at a rotational speed that corresponds to the minimum engine speed tolerated by the engine, in a fairly lengthy amount of time.

Thus, the time taken to detect that the camshaft has stopped rotating is very long, whatever the operating conditions of the engine.

By way of illustration, at the minimum engine speed 22 rpm, for a standard camshaft, the longest tooth of which measures 146°, Tcam is equal to 1.11 sec. For this calculation, the angular distances between CAM fronts are expressed in ° CRK. Therefore, the angular distance of the CAM target is 720° CRK, whereas physically it is only 360°.

There is therefore a need for a method for determining the state of rotation of the camshaft in a reduced space of time, at least under particular engine operating conditions.

In this context, the present invention is aimed at a method making it possible to determine the state of rotation of the camshaft, under certain conditions, in a time that is far shorter than in the prior art.

SUMMARY OF THE INVENTION

To this end, the method for determining the state of rotation of the camshaft, according to the invention, envisions determining a set of conditions in which it is acceptable to define a much shorter time taken to cover the angular distance between two successive camshaft wheel tooth-fronts, by considering a camshaft rotational speed higher than the speed corresponding to the minimum engine speed tolerated by the engine.

More specifically, the present invention relates to a method for determining the state of rotation of a camshaft of a vehicle engine, said engine having an engine speed and a minimum tolerated engine speed and said engine comprising:
- a crankshaft, having a state of rotation,
- means of detecting the state of rotation of the crankshaft, notably as being able to be "stopped",
- a camshaft,
- a camshaft wheel coupled to said camshaft, said camshaft wheel comprising a plurality of teeth having a degree of angle separating two successive tooth-fronts the highest value of which is referred to as the maximum degree of angle,
- a sensor provided facing the camshaft wheel and able to detect the passage of any camshaft wheel tooth-front past said sensor, said camshaft having a state of rotation notably characterized in that said camshaft is turning or is not turning, said camshaft therefore being able to exhibit the "rotating" or "stopped" states of rotation.

The method is notable in that, with
- the engine not having been synchronized, and
- the crankshaft being detected as being "stopped" or the engine not having begun a synchronization process,
- and the camshaft wheel initially exhibiting the "rotating" state of rotation, said method of determining the state of rotation of the camshaft determines that the state of rotation of the camshaft is:

"rotating" as long as the time elapsed since the last detection of a camshaft wheel tooth-front by the sensor has not reached the time Tcam_cal, Tcam_cal being defined as the theoretical length of time needed for the camshaft wheel to cover an angular distance equal to the maximum angular distance separating two successive camshaft wheel tooth-fronts at a camshaft rotational speed corresponding to a predetermined low engine speed higher than the minimum engine speed tolerated by said engine, "stopped" when the time elapsed since the last detection of a camshaft wheel tooth-front by the sensor becomes higher than the time Tcam, Tcam being defined as the theoretical length of time needed for the camshaft wheel to cover an angular distance equal to the maximum angular distance separating two successive camshaft wheel tooth-fronts at a camshaft rotational speed corresponding to the minimum engine speed tolerated by said engine, "in the process of stalling", corresponding to an intermediate state of rotation, when the time elapsed since the last detection of a camshaft wheel tooth-front by the sensor becomes higher than Tcam_cal, with Tcam_cal<Tcam, while being lower than Tcam, and in that said method of determining the state of rotation of a camshaft also determines that the state of rotation of the camshaft is "stopped" when said method of determining the state of rotation of a camshaft has determined that the state of rotation of the camshaft is "in the process of stalling", and at the same time:

the engine has not been synchronized,
the crankshaft has been detected as being "stopped" or the engine not having begun a synchronization process,
the camshaft wheel initially exhibiting the "rotating" state of rotation.

By way of, of course nonlimiting, example, as will be detailed later on, the invention finds an application with the following example: when starting the engine after a long stoppage (engine not synchronized); the start-up fails without the engine having been able to be synchronized with strong presumptions of engine rebound (successive rotations forward and backward) and the crankshaft is considered by the engine management via the CRK target to be stopped. Under these conditions, thanks to the CAM target and to the introduction of a Tcam_cal (shorter time period) according to the invention, the engine management will be able to obtain confirmation that the engine is stopped more rapidly and opt for a "risky" synchronization process (synchronization as soon as possible, with the risk of error, with no constraint on the angular distance covered on start-up), rather than a "guaranteed" synchronization process (synchronization verified over a complete engine cycle), so as, for example, to allow a further restart to be performed sooner. Tcam_cal is equal to the time taken by the camshaft wheel to cover an angular distance equal to the maximum angular distance separating two successive camshaft wheel tooth-fronts at a rotational speed corresponding to a predetermined low engine speed. The predetermined low speed is higher than the minimum speed tolerated by the engine.

Advantageously, with the engine being a vehicle combustion engine, the minimum speed tolerated by the engine is approximately equal to 22 rpm.

Advantageously, with the engine being a vehicle combustion engine, the predetermined low speed is approximately equal to 200 rpm.

Advantageously, Tcam_cal is approximately equal to 0.12 sec. For this calculation, the angular distances between CAM fronts are expressed in ° CRK. Therefore, the angular distance of the CAM target is 720° CRK, whereas physically it is only 360°.

BRIEF DESCRIPTION OF THE DRAWINGS

The invention will be better understood upon reading the following description, given solely by way of example, and with reference to the appended drawings, in which.

Figure 1:
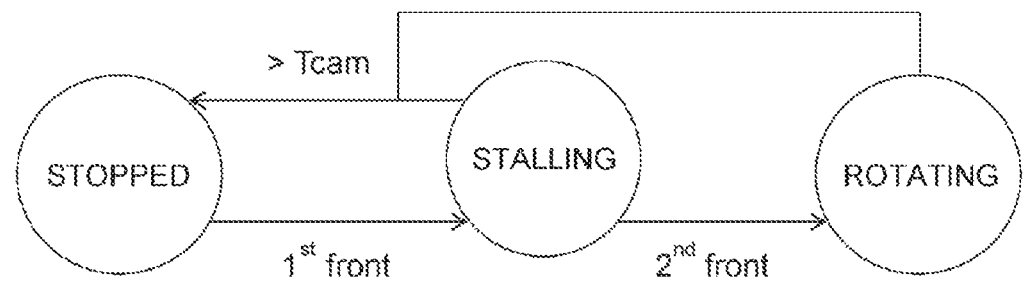
FIG. 1 depicts a state machine showing the states of rotation of the camshaft and the possible passages from one to another.

It should be noted that the figures disclose the invention and may of course also serve to better define the invention.

DETAILED DESCRIPTION OF THE PREFERRED EMBODIMENTS

The invention is presented primarily for the purpose of an application in a motor vehicle. However, other applications are also targeted by the present invention, in particular for the purpose of an implementation in any type of land vehicle.

The method according to the invention seeks to make it possible to determine the state of rotation of the camshaft in a reduced space of time, under certain conditions.

The underlying idea is that of allowing the camshafts to be determined to be no longer "rotating" as soon as the time elapsed since the last detection of a crankshaft wheel tooth-front by a dedicated sensor reaches a time Tcam_cal far shorter than Tcam.

Tcam_cal is thus defined as being the theoretical time taken by the camshaft wheel to cover, at a rotational speed higher than the rotational speed corresponding to the minimum tolerated engine speed, the angular distance corresponding to the angular distance separating the two successive camshaft wheel tooth-fronts that are spaced furthest apart from one another.

Having selected a higher engine speed for calculating the theoretical time Tcam_cal elapsed since the detection of the last camshaft wheel tooth-front by the sensor provided for that purpose, beyond which time the camshaft is no longer considered to be rotating, the determination of the state of rotation of the camshaft as no longer being "rotating" is performed in a far shorter length of time.

However, it is not conceivable to employ this principle under all engine operating conditions. This is because, in certain cases, to consider that the camshaft is no longer rotating as soon as a time longer than Tcam_cal has elapsed since the last detection of a camshaft wheel tooth-front would be to commit an error, particularly if the engine is synchronized. Specifically, considering that the camshaft is stopped has an impact on the acquisition of the data relating to the rotation of the camshaft, particularly in relation to its rotational speed, the position of the camshaft wheel tooth-fronts, etc. Now, these data are used, in particular, to guarantee engine synchronization during engine operation throughout the nominal range of engine speeds, between the minimum engine speed and a maximum engine speed.

The same applies if the engine has started a synchronization phase. Specifically, considering that the camshaft is stopped has an impact on the acquisition of the data relating to the rotation of the camshaft, particularly in relation to its rotational speed, the position of the camshaft wheel tooth-fronts, etc. Now, these data are used, in particular, to perform engine synchronization during engine operation throughout the nominal range of engine speeds, between the minimum engine speed and a maximum engine speed.

By contrast, if the crankshaft is stopped, the short time Tcam_cal can be used, because it is legitimate in this case to consider that the synchronization phase is suspended until such time as the crankshaft turns.

Figure 2:
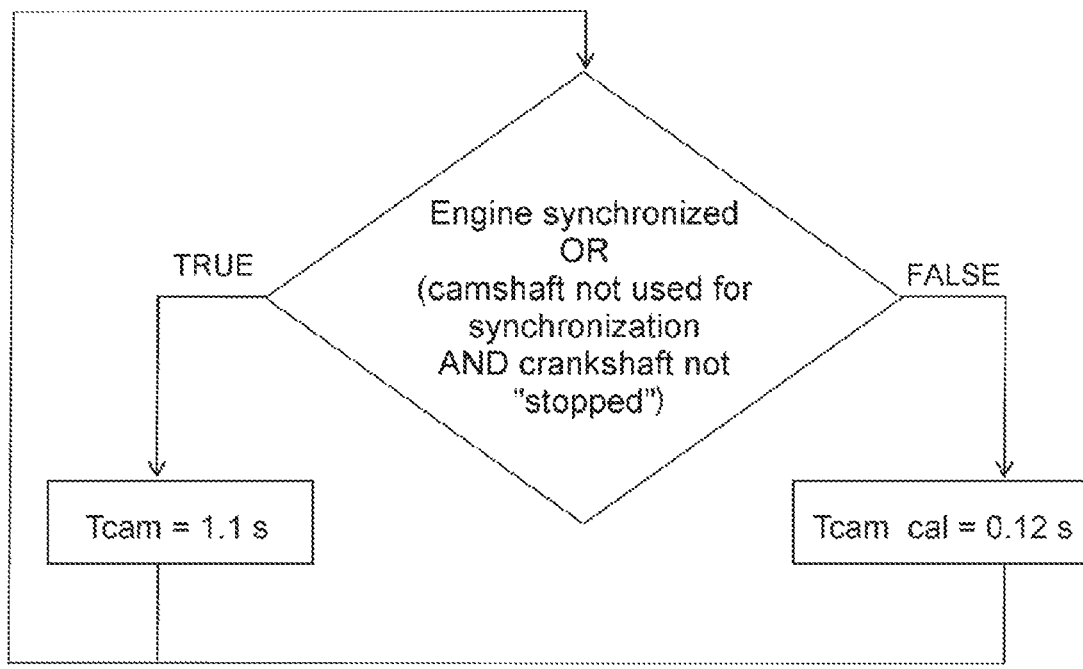
FIG. 2 is a flow diagram showing the conditions under which the method for determining the state of rotation of the engine, optimized in accordance with the invention, can be implemented.

Under these conditions, with reference to FIG. 2, the method according to the invention makes it possible to determine the state of rotation of the camshaft as no longer being "rotating" and, more specifically, as being "in the process of stalling" in a context in which, according to the engine management, i) the engine is not synchronized and in which ii) the engine has not begun a synchronization process or the crankshaft has been determined as being "stopped".

Thus, as shown in FIG. 2, as the last known state of rotation of the camshaft is "rotating", if one of the following two conditions is verified:
the engine is synchronized, OR
the camshaft is used to allow the engine to be synchronized AND the state of rotation of the crankshaft is not "stopped",
then the method of determining the state of rotation of the camshaft, as known from the prior art, applies, and the state of rotation of the camshaft becomes "stopped" as soon as the time elapsed since the last detection of a camshaft wheel tooth-front becomes longer than Tcam, namely typically 1.1 sec, to return to the numerical example of application already mentioned.

Conversely, still with reference to FIG. 2, if i) the engine is not synchronized, for example because the synchronization has been lost, and if ii) the engine management is not seeking to (re-) synchronize the engine, notably using the camshaft, or the state of rotation of the crankshaft is "stopped", then the accelerated determination method according to the present invention is implemented.

In that case, the state of rotation of the camshaft becomes "in the process of stalling" as soon as the time elapsed since the last detection of a camshaft wheel tooth-front exceeds Tcam_cal.

As mentioned previously, the time Tcam_cal corresponds to the theoretical time taken by the camshaft wheel to cover, at a rotational speed higher than the rotational speed corresponding to the minimum tolerated engine speed, the angular distance corresponding to the angular distance between the two successive camshaft wheel tooth-fronts that are spaced furthest apart from one another. In practice, even though the choice of Tcam_cal remains open, it is preferable to choose it as being higher than Tvil_cal, for example of the order of 3×Tvil_cal, and in such a way that it corresponds to an engine speed that is at the same time very low, typically markedly lower than the low-idle speed of the engine. It is recalled that the low-idle speed of an engine corresponds to a situation in which the vehicle is stationary; the driver not demanding any power, and the engine having then to develop only a minimal amount of power capable of sustaining its own movement at a speed that is optimal from a mechanical standpoint, from the standpoint of fuel consumption, noise, passenger comfort, etc., and in terms of the operation of the vehicle (provision of electrical power for an air-conditioning system, etc.). The low-idle speed is markedly higher than the minimum engine speed tolerated by the engine. Thus, in the context of a motor vehicle having a minimum tolerated speed of 22 rpm and a low-idle speed of the order of 900 rpm, it is relevant to consider, for calculating Tcam_cal, a low engine speed of 200 rpm, Tcam_cal then being equal to 0.12 sec, as compared with Tcam which, in the same context, is equal to 1.1 sec. For these calculations, the angular distances between CAM fronts are expressed in ° CRK. Therefore, the angular distance of the CAM target is 720° CRK, whereas physically it is only 360°.

Figure 3A:
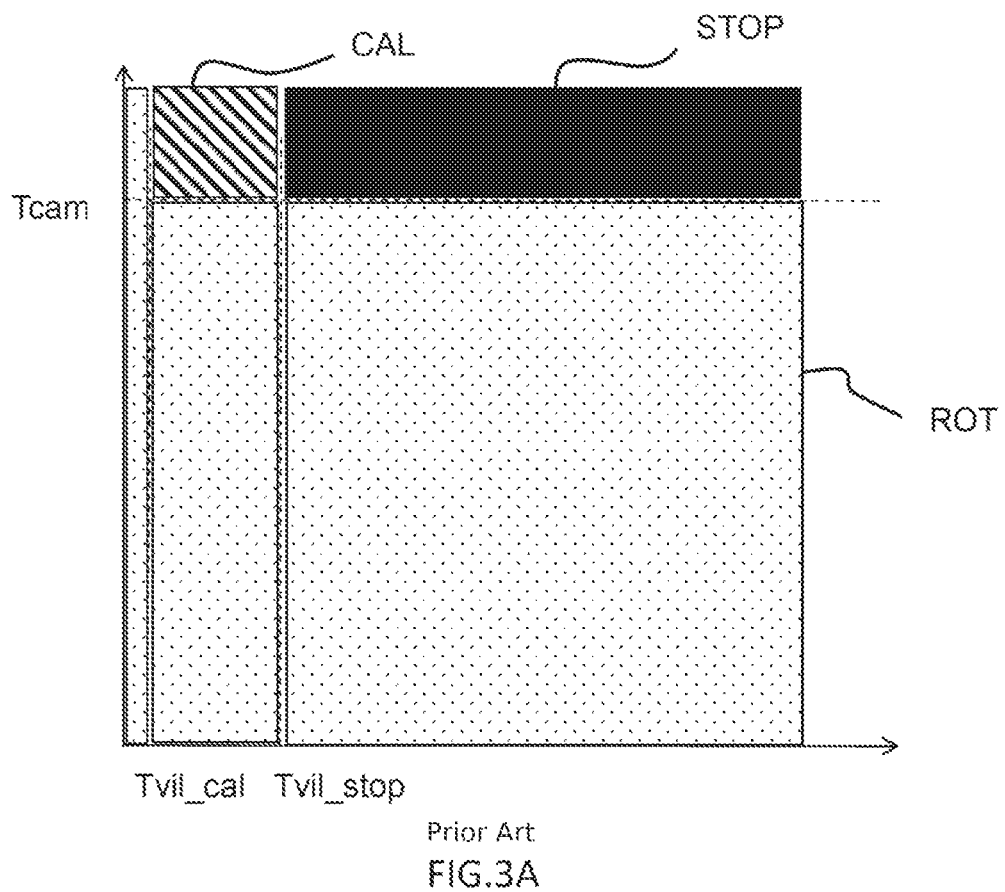
FIG. 3A is a graph showing the determining of the state of rotation of the engine, as a function of time, according to the prior art.
Figure 3B:
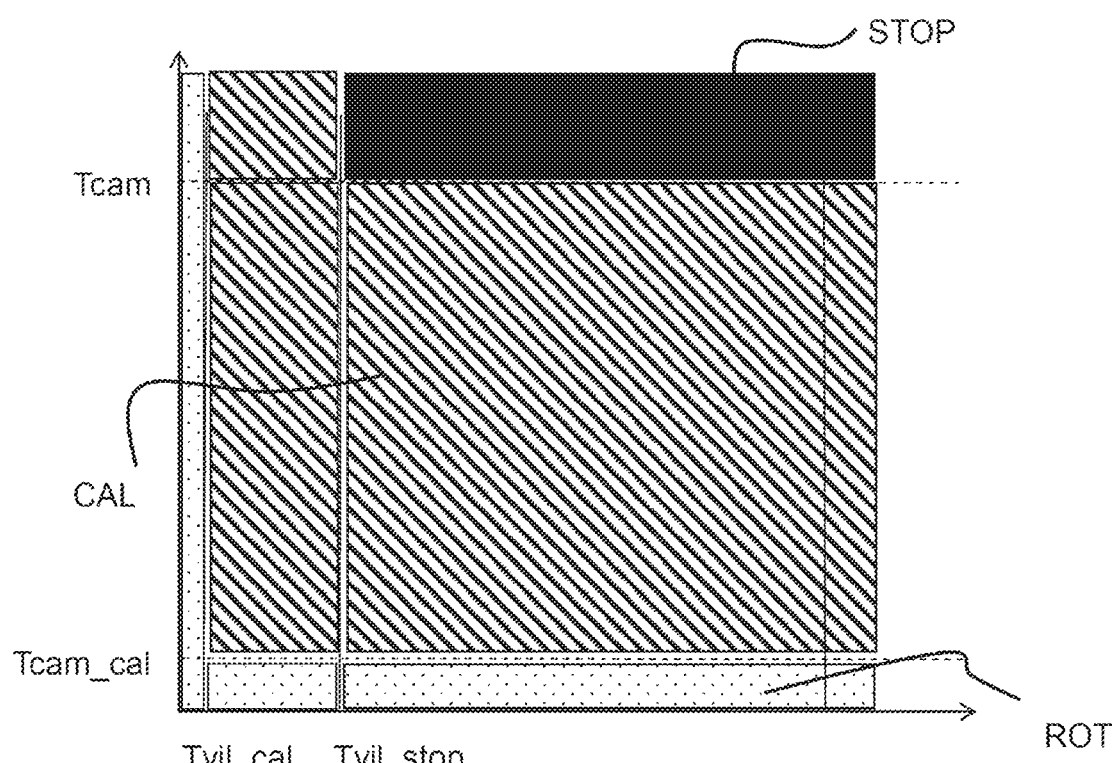
FIG. 3B is a graph showing the determining of the state of rotation of the engine, as a function of time, under a context condition, according to FIG. 2, according to the invention.

Thus, as shown by FIG. 3B, which represents the state of rotation of the engine as a function, on the abscissa axis, of the time elapsed since the last detection of a crankshaft wheel tooth-front and, on the ordinate axis, of the time elapsed since the last detection of a camshaft wheel tooth-front, the state of rotation of the engine, in the conditioned context in accordance with FIG. 2, can be determined far more quickly and precisely.

Specifically, starting from a state of rotation of the engine as being "rotating" ROT, said state of rotation of the engine becomes "in the process of stalling" CAL as soon as the state of rotation of the crankshaft and that of the camshaft are "in the process of stalling", and becomes "stopped" STOP as soon as the state of rotation of the crankshaft and that of the camshaft are "stopped". Thus, as soon as the time elapsed since the last detection of a camshaft wheel tooth-front by the sensor provided for that purpose reaches Tcam_cal, Tcam_cal being chosen to be longer than the time Tvil_cal that makes it possible to determine that the crankshaft is in the process of stalling, the engine is considered to be "in the process of stalling" CAL. Tcam_cal is typically equal to 0.12 sec, according to the embodiment already presented.

In comparison, under the same conditions, the prior art allows the state of rotation of the engine to be determined only in accordance with FIG. 3A: it is therefore necessary to wait until the time elapsed since the last detection of a camshaft wheel tooth-front by the sensor provided for that purpose reaches Tcam, typically 1.1 sec according to the embodiment already presented, in order to determine that the engine is in the process of stalling.

The method of determining the state of rotation of the camshaft of an engine, and the impact this has on the ability to determine the state of rotation of the engine, offers the twofold advantage of being faster under certain conditions and of being closer to physical reality.

Specifically, as soon as engine synchronization is lost and the crankshaft passes into the "in the process of stalling" state of rotation, the probability that the engine itself is in the process of stalling is high. According to the prior art, however, it is necessary to wait for the certainty that the camshaft is no longer rotating before determining that the engine is likewise no longer rotating.

In such a context, in which engine synchronization is lost, and not sought, it is actually relevant to use the short reference time Tcam_cal in order to determine quickly that the camshaft is "in the process of stalling". The range of time during which the state of rotation of the engine can be determined as being "in the process of stalling" is far greater than in the prior art, and this better corresponds to the physical reality of an engine in the process of stalling, which is manifested by a loss of engine synchronization and the detection of the stalling of the crankshaft, without it being necessary to wait for the camshaft to stop in order to determine that the engine is no longer rotating.

It is clarified furthermore that the present invention is not limited to the examples described above, and is open to many variants that are accessible to those skilled in the art.

The invention claimed is:

1. A method for determining a state of rotation of a camshaft of a vehicle engine equipped with a crankshaft, detecting means of detecting whether a rotation of the crankshaft is stopped, a camshaft wheel that is coupled to the camshaft and comprises a plurality of teeth, and a sensor that faces the camshaft wheel and detects passage past said sensor of a tooth-front of any tooth of the plurality of teeth, the method comprising:

on condition that
the engine has not been synchronized,
either i) the crankshaft is detected by the detecting means as being stopped or ii) the engine has not begun a synchronization process, and
the camshaft wheel is exhibiting a state of rotation of "rotating", determining said state of rotation of the camshaft as being one of:
"rotating", as long as time elapsed since a last detection of a camshaft wheel tooth-front by the sensor has not reached a theoretical length of time (Tcam_cal) required for the camshaft wheel to cover an angular distance equal to a maximum angular distance separating two successive camshaft wheel tooth-fronts at a camshaft rotational speed corresponding to a predetermined low engine speed higher than the minimum engine speed tolerated by said engine,
"stopped", when the time elapsed since the last detection of the camshaft wheel tooth-front by the sensor becomes greater than a theoretical length of time (Tcam) required for the camshaft wheel to cover an angular distance equal to the maximum angular distance separating two successive camshaft wheel tooth-fronts at a camshaft rotational speed corresponding to the minimum engine speed tolerated by said engine, or
"in the process of stalling", when the time elapsed since the last detection of the camshaft wheel tooth-front by the sensor becomes greater than Tcam_cal while being less than Tcam, where Tcam_cal<Tcam,
wherein said method of determining the state of rotation of a camshaft also determines that the state of rotation of a camshaft is "stopped" when said method of determining the state of rotation of the camshaft has determined that the state of rotation of a camshaft is "in the process of stalling".

2. The method for determining the state of a camshaft of a vehicle engine as claimed in claim 1, wherein Tcam_cal is approximately equal to 0.12 sec.

3. The method for determining the state of a camshaft of a vehicle engine as claimed in claim 1,
wherein the engine is a vehicle combustion engine, and
wherein the predetermined low speed is approximately equal to 200 rpm.

4. The method for determining the state of a camshaft of a vehicle engine as claimed in claim 3, wherein Tcam_cal is approximately equal to 0.12 sec.

5. The method for determining the state of a camshaft of a vehicle engine as claimed in claim 1,
wherein the engine is a vehicle combustion engine, and
wherein the minimum speed tolerated by the engine is approximately equal to 22 rpm.

6. The method for determining the state of a camshaft of a vehicle engine as claimed in claim 5, wherein Tcam_cal is approximately equal to 0.12 sec.

7. The method for determining the state of a camshaft of a vehicle engine as claimed in claim 5,
wherein the engine is a vehicle combustion engine, and
wherein the predetermined low speed is approximately equal to 200 rpm.

8. The method for determining the state of a camshaft of a vehicle engine as claimed in claim 7, wherein Tcam_cal is approximately equal to 0.12 sec.

9. A method for determining a state of rotation of a camshaft of a vehicle engine equipped with a crankshaft, detecting means of detecting whether a rotation of the crankshaft is stopped, a camshaft wheel that is coupled to the camshaft and comprises a plurality of teeth, and a sensor that faces the camshaft wheel and detects passage past said sensor of a tooth-front of any tooth of the plurality of teeth, the method comprising:

determining said state of rotation of the camshaft as being one of:
"rotating", as long as time elapsed since a last detection of a camshaft wheel tooth-front by the sensor has not reached a theoretical length of time (Tcam_cal) required for the camshaft wheel to cover an angular distance equal to a maximum angular distance separating two successive camshaft wheel tooth-fronts at a camshaft rotational speed corresponding to a predetermined low engine speed higher than the minimum engine speed tolerated by said engine,
"stopped", when the time elapsed since the last detection of the camshaft wheel tooth-front by the sensor becomes greater than a theoretical length of time (Tcam) required for the camshaft wheel to cover an angular distance equal to the maximum angular distance separating two successive camshaft wheel tooth-fronts at a camshaft rotational speed corresponding to the minimum engine speed tolerated by said engine, and
"in the process of stalling", when the time elapsed since the last detection of the camshaft wheel tooth-front by the sensor becomes greater than Tcam_cal but is less than Tcam, where Tcam_cal<Tcam,
wherein, if the state of rotation is determined as "in the process of stalling", and all the following conditions are met:
(A) the engine has not been synchronized,
(B) either i) the crankshaft is detected by the detecting means as being stopped or ii) the engine has not begun a synchronization process, and
(C) the camshaft wheel is initially exhibiting a state of rotation of "rotating",
then the state of rotation is determined as "stopped".

10. The method for determining the state of a camshaft of a vehicle engine as claimed in claim 9, wherein Tcam_cal is approximately equal to 0.12 sec.

11. The method for determining the state of a camshaft of a vehicle engine as claimed in claim 9,
wherein the engine is a vehicle combustion engine, and
wherein the predetermined low speed is approximately equal to 200 rpm.

12. The method for determining the state of a camshaft of a vehicle engine as claimed in claim 11, wherein Tcam_cal is approximately equal to 0.12 sec.

13. The method for determining the state of a camshaft of a vehicle engine as claimed in claim 9,
wherein the engine is a vehicle combustion engine, and
wherein the minimum speed tolerated by the engine is approximately equal to 22 rpm.

14. The method for determining the state of a camshaft of a vehicle engine as claimed in claim 13, wherein Tcam_cal is approximately equal to 0.12 sec.

15. The method for determining the state of a camshaft of a vehicle engine as claimed in claim 13,
wherein the engine is a vehicle combustion engine, and
wherein the predetermined low speed is approximately equal to 200 rpm.

16. The method for determining the state of a camshaft of a vehicle engine as claimed in claim 15, wherein Tcam_cal is approximately equal to 0.12 sec.

\* \* \* \* \*